3,563,760
PRODUCTION OF A FERMENTED MILK PRODUCT
Seiji Kuwabara, Tokyo, Japan; Jun Kuwabara, sole heir of said Seiji Kuwabara, deceased, assignor to Tokyo Yakult Seizo Co., Ltd., Tokyo, Japan
No Drawing. Filed May 16, 1968, Ser. No. 729,541
Int. Cl. A23c 9/12
U.S. Cl. 99—59         10 Claims

ABSTRACT OF THE DISCLOSURE

A process for the production of a fermented milk, to be similar to yoghurt in pleasant odor and containing active lactic acid bacteria, by fermenting whole milk or skim milk in two steps. In the first step, the yeast is cultivated in whole milk or skim milk, said yeast having no lactose fermentability and producing aromatic substances only, without causing alcoholic fermentation in the whole or skim milk. In the second step, said milk is fermented with lactic acid bacteria after sterilization of the yeast in the milk.

---

This invention relates to a process for the production of a fermented milk and its product similar to yoghurt, which contains active lactic acid bacteria.

It is an object of this invention to improve the process for the production of a fermented milk having a pleasant flavor and containing active lactic acid bacteria.

It is a further object of this invention to produce a fermented milk similar to yoghurt which is more delicious and nutritious and contains more viable cells of lactic acid bacteria than ordinary yoghurt.

Further objects and advantages of the invention will be apparent from the following detailed explanation.

It is conventionally known to produce a fermented milk in which whole milk or skim milk combined with sugar and aromatics is fermented with lactic acid bacteria.

The flavor of such a known product results from fermentation with lactic acid bacteria and artificial aromatics added thereto.

When yeasts are used for the production of fermented milk to produce aromatic substances, the formation of a complete curd in the milk is prevented due to the generation of carbonic gas from alcoholic fermentation.

Furthermore, yeasts cause, in some cases, alcoholic fermentation of the lactose in milk to produce alcohol in the milk. The sterilization of yeast in milk with heat then causes a separation of alcohol-denatured milk protein from the whey solution in the milk, and the following fermentation with lactic acid bacteria is unsatisfactory because of the reduced lactic acid bacteria growth in the said milk.

In order to prevent the separation of alcohol-denatured milk protein from the whey solution in the milk, many complex processes for the production of fermented milk similar to yoghurt are required. For example, a process for controlling alcohol concentration in the milk is required.

The inventor has made studies on a method of the production of a yoghurt-like-fermented milk containing active lactic acid bacteria, which has a pleasant odor attributive to fermented milk products and which is more delicious, nutritious and has a longer storage term than yoghurt.

Thus, the inventor has found that there is no separation of milk protein from the whey solution in the milk after the sterilization of yeast in the milk, when a yeast which grows adequately in the milk by assimilating lactose, but produces little of alcohol and aromatic substances, is cultivated in the milk.

Moreover the inventor has found that fermentation of the milk with lactic acid bacteria after sterilization of the yeast with heat is more satisfactory and the fermented milk thus produced possesses a finer flavor, better taste and better consistency compared with the product obtained by cultivating yeast having fermentative ability of lactose in whole milk or skim milk and then fermenting the said milk with lactic acid bacteria, when a yeast which has no fermentability of lactose and produces aromatic substances without causing alcoholic fermentation in whole milk or skim milk, is cultivated in whole milk or skim milk.

This invention is based upon the above findings and relates to a process for the production of a yoghurt-like fermented milk containing active lactic acid bacteria which comprises culturing yeast in whole milk or skim milk, said yeast having no fermentability of lactose in whole milk or skim milk and producing aromatic substances only without causing alcoholic fermentation in whole milk or skim milk, sterilizing the yeast in the whole milk or skim milk, cooling the sterilized milk and then inoculating the said milk with lactic acid bacteria, fermenting the said milk and, if necessary, mixing the fermented milk thus produced and suitable additives.

A process for the production of the fermented milk in accordance with this invention comprises the two steps as described above, the first step being the culturing of the above-mentioned yeast in whole milk or skim milk and the second step being the culturing of lactic acid bacteria, after sterilization of the yeast in the milk.

In the first step, the yeast is cultivated in whole milk or skim milk. It is possible in some cases to add 2 or 3% sucrose to the whole milk or skim milk.

The yeast to be preferably used in this invention is one selected from the yeast belonging to the genus Kloeckera, species *hanseniaspola* Lindneri, *Brettanomyces bruxellensis*, *Zygosaccharomyces* Sake, etc. As a preferable yeast belonging to the genus Kloeckera. There may be mentioned, for instance, *Kloeckera africana* Janke and *Klockera apiculata*.

After culturing the yeast in the whole milk of skim milk for 15 or 20 hours at 25 or 30° C., the milk thus obtained is sterilized with heat, for instance, at 100° C. for 30 minutes. Then the sterilized milk is cooled with water or air to a suitable temperature, for instance, about 30° C. After cooling the sterilized milk, it is inoculated with the lactic acid bacteria and incubated at from about 25 to about 35° C. until its acidity reaches about 0.8 to 1.0%.

As the lactice acid bacteria, for example, *Lactobacillus acidophilus*, *Lactobacillus bulgaricus*, *Lactobacillus casei*, *Streptococcus thermophillus*, *Streptococcus lactis* or *Streptococcus diacetilactis* is preferably used for the purpose. In this invention, one or more lactic acid bacteria may be used; and, especially, the most satisfactory result is obtained when one of *Lactobacillus acidophilus* and *Lactobacillus casei* is used with one of *Streptococcus thermophilus* and *Streptococcus lactis*.

According to the invention, no separation of milk protein from the whey solution is found after sterilizing yeast cultivated in while milk or skim milk.

Furthermore, no generation of carbonic gas by alcoholic fermentation is found, since the yeast does not cause alcoholic fermentation in whole milk or skim milk.

According to the invention, the fermentation with lactic acid bacteria is more satisfactory and the fermented milk thus produced has a finer flavor and better taste and consistency as compared with the product produced by fermenting the milk with lactic acid bacteria alone.

Such particularities as above are due to the cooperation of the above-mentioned yeast and lactic acid bacteria.

The fermented milk thus produced may be mixed with suitable additvies according to taste, if desired.

As such additives, tea, fruits may preferably be used. Fruit extract, coffee extract, tea powder or tea extract, green tea powder or green tea extract may be also used as the additives.

Moreover these additives may be used in the form of sugar syrup and it is advantageous to use germ-free-sugar syrup in this manner.

The mixture of the fermented milk and the syrup may be homogenized under the pressure of 30 to 100 kg./cm.$^2$.

The product in accordance with this invention is similar to yoghurt. The product of the invention is very good fermented milk viewed from such points are flavor, taste, consistency, nutrition, etc. A better product, having delicious flavor, better taste and better consistency is obtained by using one of *Lactobacillus acidophilus* and *Lactobacillus casei* with *Streptococcus thermophilus* or *Streptococcus lactis* as the lactice acid bacteria.

The following examples illustrate embodiment of carrying out this invention into practice.

EXAMPLE 1

1 g. of milk culture in which *Kloeckera africana* Janke or *Kloeckera apiculata* have been cultivated is added to 1 kg. of skim milk or whole milk and then the milk mediun is incubated at 25 to 30° C. for 15 to 25 hours.

After 15 to 25 hours, the obtained milk in which the yeast have been grown is sterilized with heat at 100° C. for 30 minutes. After cooling the sterilized milk with water, the obtained milk is inoculated with 1. g. of *Lactobacillus acidophilus* culture and 1 g. of *Streptococcus lactis* culture, and incubated at 25-35° C. for 17-25 hours until its acidity has reached 0.8-1.0% in the obtained milk.

The fermented milk thus obtained and green tea syrup produced by mixing sugar, green tea powder and water at the ratio of 27:1:12, are mixed.

The mixture is homogenized in a homogenizer and the final fermented milk product is stored in a refrigerator.

EXAMPLE 2

10 g. of milk culture in which *Hanseniaspora* Lindneri have been cultivated is added to 1 kg. of skim milk or whole milk and then the milk medium is incubated at 25 to 30° C. for 15 to 25 hours.

After 15 to 25 hours, the obtained milk in which the yeast have been grown is sterilized with heat at 100° C. for 30 minutes. After cooling the sterilized milk with water, the milk is inoculated with 1 g. of *Lactobacillus casei* culture and 1 g. of *Streptococcus thermophilus* culture and incubated at 25 to 35° C. for 17 to 25 hours until its acidity has reached 0.8–1.0% in the obtained milk.

The fermented milk thus obtained orange syrup.

The mixture is homogenized in a homogenized and the final fermented milk product is stored in a refrigerator.

EXAMPLE 3

A fermented milk product is produced as in Example 2 except for using *Brettanomyces bruxellensis* or *Zygosaccharomyces* Sake and *Hanseniaspola* Lindneri.

I claim:
1. A process for the production of a yoghurt-like fermented milk containing active lactic acid bacteria comprising cultivating a first mixture consisting essentially of yeast and whole milk or skim milk at 25 to 30° C. for 10 to 20 hours, said yeast having no ability to ferment lactose in whole milk or skim milk and which produces aromatic substances only without causing alcoholic fermentation in whole milk or skim milk, thereafter sterilizing the whole milk or skim milk containing the yeast, cooling the sterilized milk, innoculating the cooled sterilized milk with lactic acid bacteria, thereby forming a second mixture consisting essentially of said sterilized, cooled milk and said bacteria, cultivating said second mixture at 25 to 30° C. for 10 to 20 hours and recovering the fermented milk thus produced.

2. A process according to claim 1, in which the yeast to be used is one selected from the group consisting of the genus Kloeckera, *hanseniaspola* Lindneri, *Brettanomyces bruxellensis* and *Zygosaccharomyces* Sake.

3. A process according to claim 2, in which the yeast belonging to the genus Kloeckera is selected from the group consisting of *Kloeckera africana* Janke and *Kloeckera apiculata*.

4. A process according to claim 1 wherein the lactic acid bacteria employed in the fermentation is selected from the group consisting of *Lactobacillus acidophilus*, *Lactobacillus casei*, *Streptococcus thermophilus*, *Streptococus lactis*, *Lactobacillus bulgaricus* and *Streptococcus diacetilactis*.

5. A process according to claim 4, in which one of *Lactobacillus acidophilus* and *Lactobacillus casei* is used with one of *Streptococcus thermophilus* and *Streptococcus lactics* to ferment the sterilized milk.

6. A process according to claim 1 wherein said fermented milk is mixed with suitable additives.

7. A process according to claim 6 in which the additive is selected from the group consisting of coffee extract, tea powder, tea extract, green-tea extract and green tea powder.

8. A process according to claim 6 in which the additive is in the form of sugar syrup.

9. A process according to claim 8, in which sugar syrup is germ free.

10. A process according to claim 8 in which the mixture of the fermented milk and the syrup is homogenized under the pressure of 30 to 100 kg./cm.$^2$.

References Cited

UNITED STATES PATENTS

| | | | |
|---|---|---|---|
| 1,710,133 | 4/1929 | Winkler | 99—59 |
| 2,824,804 | 2/1958 | Mishima | 99—59 |
| 3,235,387 | 2/1966 | Stumbo et al. | 99—59 |
| 3,269,842 | 8/1966 | Mayer et al. | 99—59 |

OTHER REFERENCES

Cook, A. H.: The Chemistry and Biology of Yeasts, Academic Press Inc., N.Y., 1958 (pp. 276–178), OR 151C6C.2.

Kosikowski, F.: Cheese and Fermented Milk Foods. Edwards Brothers, Inc., Ann Arbor, Mich., 1966 (p. 59); SF271.K6.

LIONEL M. SHAPIRO, Primary Examiner

D. M. NAFF, Assistant Examiner